US010812445B2

(12) United States Patent
Ramaraj et al.

(10) Patent No.: US 10,812,445 B2
(45) Date of Patent: *Oct. 20, 2020

(54) CLOUD ACCESS TO LOCAL NETWORK ADDRESSES

(71) Applicant: SLING MEDIA PVT LTD, Bengaluru (IN)

(72) Inventors: Jayaprakash Narayanan Ramaraj, Bengaluru (IN); Suhas Nayak, Bengaluru (IN); Joyce Jojo, Bengaluru (IN); Gopikumar Ranganathan, Bengaluru (IN)

(73) Assignee: SLING MEDIA PVT LTD, Bengaluru (IN)

(*) Notice: Subject to any disclaimer, the term of this patent is extended or adjusted under 35 U.S.C. 154(b) by 0 days.

This patent is subject to a terminal disclaimer.

(21) Appl. No.: 16/005,517

(22) Filed: Jun. 11, 2018

(65) Prior Publication Data

US 2019/0253382 A1 Aug. 15, 2019

(30) Foreign Application Priority Data

Feb. 13, 2018 (IN) .............................. 201841005338

(51) Int. Cl.
*H04L 29/12* (2006.01)
*H04L 12/801* (2013.01)
(Continued)

(52) U.S. Cl.
CPC .......... *H04L 61/2007* (2013.01); *H04L 45/74* (2013.01); *H04L 47/34* (2013.01);
(Continued)

(58) Field of Classification Search
CPC ..... H04L 61/2535; H04L 45/02; H04L 47/34; H04L 61/2007; H04L 67/16; H04L 67/32;
(Continued)

(56) References Cited

U.S. PATENT DOCUMENTS 6,405,239 B1 6/2002 Addington et al.
7,099,944 B1 * 8/2006 Anschutz ............ H04L 12/5692
370/352
(Continued)

OTHER PUBLICATIONS

European Patent Office, International Searching Authority, International Search Report and Written Opinion for International Application No. PCT/US2013/065061, dated Jan. 30, 2014.
(Continued)

*Primary Examiner* — Greg C Bengzon
(74) *Attorney, Agent, or Firm* — Lorenz & Kopf LLP

(57) ABSTRACT

Various systems, device and automated processes allow video streaming hosts or other server devices to publish their internal/local addresses (e.g., addresses used on a subnet or other local area network) to a backend address server operating on a wide area network (WAN) such as the Internet. Client devices attempting to subsequently contact server devices operating in the same local network can contact the address to obtain the internal address of the target server, thereby allowing direct LAN connections between clients and servers.

8 Claims, 2 Drawing Sheets

(51) Int. Cl.
  *H04L 29/08* (2006.01)
  *H04L 29/06* (2006.01)
  *H04L 12/741* (2013.01)

(52) U.S. Cl.
  CPC .............. *H04L 67/16* (2013.01); *H04L 67/32* (2013.01); *H04L 67/42* (2013.01)

(58) Field of Classification Search
  CPC ... H04L 67/42; H04L 61/103; H04L 61/1535; H04L 61/1541; H04L 61/1552; H04L 61/1588; H04L 61/2038; H04L 61/2046; H04L 61/2061; H04L 61/2069; H04L 61/2567; H04L 61/2582; H04L 61/2585; H04L 61/6077; H04L 61/6081; H04L 63/029; H04L 45/04; H04L 45/08; H04L 45/74; H04L 45/745; H04L 67/288; H04L 65/1033; H04L 65/1036; H04L 65/1069; H04L 65/1073; H04L 12/2818; H04L 12/2834; H04L 12/2816; H04L 12/2825; H04L 12/283; H04L 12/2836; H04L 12/66; H04L 41/0803; H04L 41/12; H04L 67/12; H04L 12/2807; H04L 12/2809; H04L 12/282; H04L 12/2823; H04L 12/4633; H04L 41/044; H04L 41/08; H04L 41/14; H04L 43/10; H04L 67/04; H04L 67/104; H04L 67/1091; H04W 84/12; H04W 4/16; H04W 4/60; H04W 4/80; H04W 76/11; H04W 8/22; H04W 8/26; H04W 48/08; H04W 4/14; H04W 84/18; H04W 88/08; H04W 92/18; H04M 1/72533; H04N 21/4126; H04N 21/4147; H04N 21/422; H04N 21/42201; H04N 21/4223; H04N 21/4333; H04N 21/4334; H04N 21/4405; H04N 21/4623; H04N 21/47214

See application file for complete search history.

(56) References Cited

U.S. PATENT DOCUMENTS

| | | | | |
|---|---|---|---|---|
| 8,626,879 | B2 | 1/2014 | Dham et al. | |
| 9,053,494 | B2* | 6/2015 | Lewis | G06Q 30/0241 |
| 9,143,400 | B1* | 9/2015 | Roskind | H04L 41/0896 |
| 9,407,624 | B1* | 8/2016 | Myers | H04W 12/04 |
| 10,652,796 | B2* | 5/2020 | Laliberte | H04W 36/14 |
| 2003/0028623 | A1 | 2/2003 | Hennessey et al. | |
| 2003/0041238 | A1* | 2/2003 | French | H04L 29/06 713/153 |
| 2003/0149755 | A1 | 8/2003 | Sadot | |
| 2004/0261116 | A1* | 12/2004 | Mckeown | H04L 43/00 725/109 |
| 2005/0102415 | A1* | 5/2005 | Ishiyama | H04L 69/16 709/238 |
| 2007/0058617 | A1* | 3/2007 | Stiemerling | H04L 29/06027 370/352 |
| 2007/0153794 | A1* | 7/2007 | Smith | H04L 63/061 370/390 |
| 2007/0171842 | A1* | 7/2007 | Dow | H04L 29/12783 370/254 |
| 2007/0198532 | A1 | 8/2007 | Krikorian et al. | |
| 2008/0148379 | A1 | 6/2008 | Xu et al. | |
| 2009/0043900 | A1* | 2/2009 | Barber | H04L 29/12801 709/228 |
| 2010/0293297 | A1* | 11/2010 | Perumal | H04L 61/2589 709/245 |
| 2010/0318665 | A1* | 12/2010 | Demmer | H04L 69/163 709/227 |
| 2011/0055322 | A1 | 3/2011 | Gregersen | |
| 2011/0125925 | A1* | 5/2011 | Bouthemy | H04L 12/2834 709/250 |
| 2011/0137980 | A1* | 6/2011 | Kim | H04L 67/16 709/203 |
| 2011/0153718 | A1* | 6/2011 | Dham | H04L 69/22 709/203 |
| 2011/0153845 | A1 | 6/2011 | Rao et al. | |
| 2012/0158996 | A1 | 6/2012 | Thaler, III | |
| 2012/0254476 | A1* | 10/2012 | De Souza | H04L 29/08846 710/10 |
| 2012/0284385 | A1* | 11/2012 | Kavanaugh | H04W 4/70 709/223 |
| 2013/0086245 | A1* | 4/2013 | Lu | H04L 12/2807 709/223 |
| 2013/0205018 | A1* | 8/2013 | Rahman | H04L 12/2809 709/224 |
| 2014/0075488 | A1 | 3/2014 | Christudass et al. | |
| 2014/0108650 | A1* | 4/2014 | Asnis | H04L 67/1008 709/224 |
| 2014/0195587 | A1* | 7/2014 | Sukoff | H04L 67/42 709/203 |
| 2014/0281006 | A1* | 9/2014 | Major | H04L 65/60 709/231 |
| 2014/0304418 | A1* | 10/2014 | Torok | H04L 67/1006 709/228 |
| 2014/0330951 | A1* | 11/2014 | Sukoff | H04L 47/70 709/223 |
| 2015/0006746 | A1 | 1/2015 | Lucas et al. | |
| 2015/0022666 | A1* | 1/2015 | Kay | H04L 65/4084 348/159 |
| 2015/0237006 | A1* | 8/2015 | Hu | H04L 67/1097 709/204 |
| 2015/0312103 | A1* | 10/2015 | Arose | H04L 41/12 370/255 |
| 2015/0350044 | A1* | 12/2015 | Thomassian | H04L 61/1511 370/252 |
| 2016/0277217 | A1* | 9/2016 | Lu | H04L 12/2816 |
| 2017/0019435 | A1* | 1/2017 | Toutain | H04L 51/046 |
| 2017/0134439 | A1* | 5/2017 | Ku | H04L 65/1069 |
| 2017/0195386 | A1* | 7/2017 | Nathan | H04L 67/42 |
| 2017/0201571 | A1* | 7/2017 | Sherf | H04L 43/0817 |
| 2017/0346793 | A1* | 11/2017 | Gould | H04L 12/2803 |
| 2018/0146244 | A1 | 5/2018 | Krikorian et al. | |
| 2018/0205635 | A1* | 7/2018 | Kim | G06F 16/182 |
| 2018/0219783 | A1* | 8/2018 | Pfister | H04L 67/1023 |
| 2018/0262537 | A1* | 9/2018 | Marque-Pucheu | H04L 61/2553 |
| 2019/0149449 | A1* | 5/2019 | Morris | H04L 45/02 709/238 |
| 2019/0158545 | A1* | 5/2019 | Moore | H04L 61/2589 |
| 2019/0182734 | A1* | 6/2019 | Laliberte | H04L 65/10 |

OTHER PUBLICATIONS

The International Bureau of WIPO, International Preliminary Report on Patentability in International Application No. PCT/US2013/065061 dated Apr. 23, 2015.

* cited by examiner

CLOUD ACCESS TO LOCAL NETWORK ADDRESSES

PRIORITY CLAIM

This application claims the benefit of India Provisional Patent Application No. 201841005338, filed on Feb. 13, 2018.

TECHNICAL FIELD

The following discussion generally relates to communications over a digital network. More specifically, the following discussion relates to devices, systems, and automated processes to establish communications between networked devices.

BACKGROUND

Network communication continues to affect almost every aspect of modern life. In the home environment, for example, it is now commonplace for home appliances, security systems, entertainment devices, lights, thermostats, locks and many other devices to inter-communicate with each other and/or with network services on the Internet. Such devices are also commonplace in offices, factories, restaurants, pubs and other locations. Moreover, many people now carry portable computing devices such as mobile phones, tablets, etc. as they carry on their life at home, work, travel and other places.

Often, substantial challenges arise in establishing communications between devices that are located within the same home or office environment. Many homes and offices nowadays include multiple wired and/or wireless local area networks (LANs) behind a common router or firewall, so devices operating on different LANs (or subnets of LANs) within the same environment can have difficulty in locating each other. In particular, devices operating on different LANs (e.g., different WIFI zones, or wired or wireless networks) may not be able to see each other directly, and may not share an intervening router or gateway device that can readily establish connections between the different devices. A mobile phone communicating on a home network via a Wi-fi connection, for example, may not be able to directly communicate with a file, print or media server that is operating within the same home, but that is connected to the network through another wired or wireless network. This often occurs because devices do not have dedicated addresses on the wide area network (WAN), but rather communicate on the WAN using a port on a router or gateway device. Communications between the gateway and the local device make use of local addresses that may not be visible to the WAN, or even to other LANs operating within the home environment. Locating a device on another LAN, then, can be a substantial challenge in practice.

It is therefore desirable to create devices, systems and processes to improve network communications between devices operating within a home or other environment. Other desirable features and characteristics will become apparent from the subsequent detailed description and the appended claims, taken in conjunction with the accompanying drawings and this background section.

BRIEF SUMMARY

Various embodiments improve network connectivity between devices operating behind a common router or gateway device by initiating outward contact from the device to an address server residing on the Internet (or another wide area network). The server device initially provides its local address (e.g., a network address used for communications on its LAN) as well as any additional addresses of routers, gateways or other network devices residing between the device and it's gateway to the wide area network. When a client device operating behind the same gateway intends to contact the server, the client initially requests the target device's routing information from the address server operating on the WAN. The client can then attempt to reach the target device using one or more of the obtained local addresses that are associated with the target.

In one example, an automated process is executed by a processor of a target computing device to establish a connection with a client device within a network environment. The process suitably comprises: determining, by the target device, a sequence of network addresses corresponding to router devices that couple the target device to a wide area network; providing the sequence of network addresses to an address server operating on the wide area network for storage by the address server and subsequent transmission of the sequence of network addresses from the address server to the client device; and subsequently responding to a request from the client device, wherein the client device transmits the request to at least one of the network addresses in the sequence obtained by the client device from the address server on the wide area network.

Other embodiments relate to device and/or automated processes executable by a processor of a client computing device to establish a connection with a target device within a network environment. The automated process suitably comprises: transmitting, by the client device, a request for server addresses to an address server operating on a wide area network; receiving, in response to the request for server addresses, a sequence of network addresses associated with the target device, wherein each of the sequence of network addresses corresponds to a different network address associated with the target device within the network environment; initiating a connection between the client device and the target device by transmitting a contact message to each of the network addresses in the sequence; and in response to a reply message received from the target device in response to the contact message, the client device establishing the connection with the target device.

Other embodiments relate to an address server system implemented with one or more computers and database servers. Various embodiments relate to automated processes executable by an address server system operating on a wide area network to establish a direct connection between a client device and a target device that are both operating on a local network environment that is separated from the wide area network by a router. The process suitably comprises: receiving, by the address server system, a sequence of local addresses associated with a target device operating within the local network environment that is separated from the wide area network by the router, wherein each of the sequence of network addresses corresponds to a different network address associated with the target device within the network environment; storing the received sequence of addresses in a database;

subsequently receiving, by the address server system, a request for server addresses from a client device that is also operating on the local environment that is separated from the wide area network by the router; transmitting, by the address server system in response to the request received from the client device, the sequence of network addresses associated with the target device to the client device to thereby permit the client device to initiate a connection between the client device and the target device by transmitting contact messages to each of the network addresses in the sequence via the local environment.

Other examples may relate to various client or server computing systems or devices, and/or automated processes executed by client or server computing systems or devices. Such systems, devices and processes may relate to network servers, network clients, network address servers and/or other computing entities as desired. Various additional examples, aspects and other features are described in more detail below.

BRIEF DESCRIPTION OF THE DRAWING FIGURES

Example embodiments will hereinafter be described in conjunction with the following drawing figures, wherein like numerals denote like elements, and:

DETAILED DESCRIPTION

The following detailed description is intended to provide various examples, but it is not intended to limit the invention or the application and uses of the invention. Furthermore, there is no intention to be bound by any theory presented in the preceding background or the following detailed description.

According to various embodiments, server devices operating within a home, office or similar network environment initially determine information about their location within the network environment. For example, the server can ascertain a sequence of addresses and port numbers that are used by routers, gateways and other devices that deliver electronic traffic to the server device. This sequence of local addresses (or other information) can be transmitted for storage by an address server operating on the Internet or another wide area network (WAN). When client devices attempt to contact the server, the client can first contact the address server to obtain the sequence of local addresses that are associated with the server devices operating within the local network. This allows the client device to contact a target server device using one or more of the local addresses in the sequence, as desired. By providing a mechanism by which local addresses can be delivered, problems previously associated with locating hosts on the local area network can be overcome, thereby greatly improving device discovery and connect-ability within the local network environment.

Figure 1:
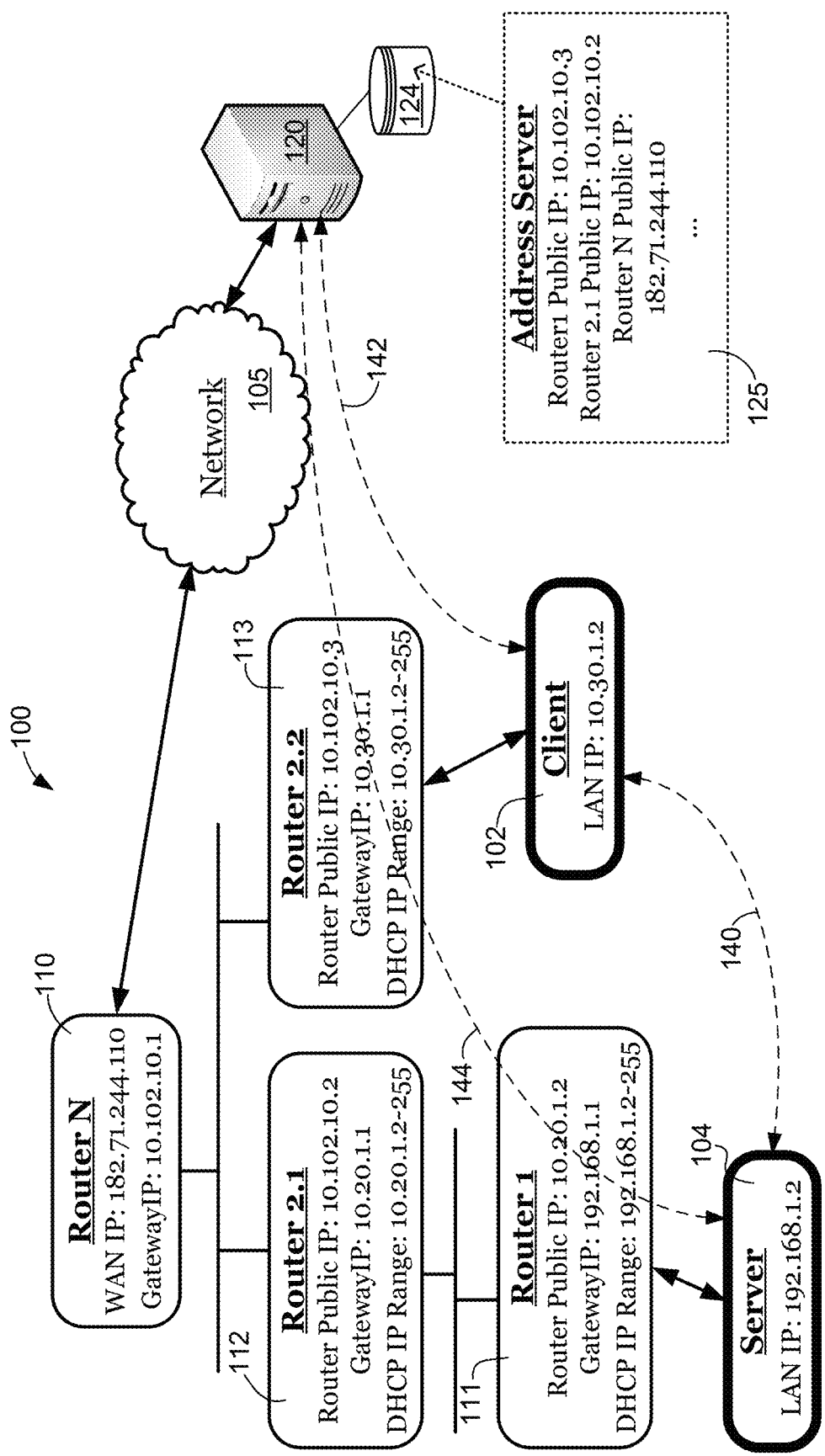
FIG. 1 illustrates one example of a network environment operating within a home, office or similar location.

FIG. 1 illustrates an example of a network environment 100 in which a client 102 and a server 104 operate behind a common router device 110. In this example, router 110 connects a home environment made up of several local area networks (LANs) to the Internet or another wide area network 105. Each LAN is managed by a separate router device 110, 111, 112, 113. In the illustrated example, the two devices 102, 104 are separated by three different router devices 111, 112, 113. Each device 110-114 corresponds to wired or wireless router or gateway devices, for example, or to any number of other network control devices, as appropriate. Device 110 may be a home gateway that communicates with a cable, fiber optic, digital subscriber line (DSL) or similar modem, for example, to directly connect to the WAN 205. Devices 111-112 may correspond to Wi-Fi gateways, virtual private network (VPN) gateways, wired or wireless router devices, firewalls and/or other devices as desired. Each device 110-114 is typically implemented as a computing device with conventional processor, memory, input/output and similar features that operate under the control of software or firmware instructions to execute the various functions described herein, as desired.

In the example illustrated in FIG. 1, it can often be a substantial challenge for the two nodes to find each other and establish a direct connection even though client 102 and server 104 operate on the same local environment 100 behind router 110. This is partially due to the different address domains used by the different routers 110-113 in environment 100. Moreover, one or more routers 110-113 may not be configured to forward discovery broadcasts from client 102 on other networks, particularly if the discovery broadcast is a proprietary or otherwise unique format, thereby making device discovery across multiple LANs more difficult. Since router and gateway configuration can be complex for many users, particularly in the home environment, it can be desirable to use a different mechanism for clients and servers to find each other that does not rely upon specific configuration of devices 110-114 operating within environment 100.

To that end, server 104 initially gathers information about its logical position within network environment 100 and forwards the gathered information to an external address server 120 for storage and subsequent retrieval. Typically, network routers and gateways are configured to allow most outgoing traffic to network 105 even if incoming traffic is severely restricted. That is, most router devices (e.g., router 110) are configured by default to permit wide access for outgoing traffic while preventing access to the internal network by incoming traffic. Similarly, most internal routing devices 111-113 will allow relatively open access to communications heading toward wide area network 105.

It is therefore relatively straightforward for server 104 to create an outgoing connection 144 to address server 120 operating on network 105 that can be used to transmit one or more addresses that are known to server 104. Similarly, client 102 can place a subsequent outgoing request 142 to the address server 120 to request addresses associated with any servers 104 operating on the same local environment 100. By storing network addresses associated with server 104 (including network addresses used on the internal network environment 100) with an external address server 120, then, the client 102 can more conveniently obtain local addressing information about the server 104. These local addresses, in turn, can be used to create direct connections 140 between client 102 and server 104 via the local network environment 100 even though local addresses are not directly shared between different LANs, and/or even though different LAN addresses are incompatible between different LANs operating on the same home environment, as appropriate.

FIG. 1 illustrates one example of a client 102 attempting to connect to a server 104 operating within the same network environment 100. The particular environment 100 shown in the figure is intended to illustrate the concepts described herein, but equivalent embodiments could implement any other network scheme using any number of router/gateway devices arranged in any topology.

In the example illustrated in FIG. 1, server 104 uses an internet protocol (IP) address of 192.168.1.2 on its immediate network behind router 111. Router 111 uses an address of 10.20.1.2 on its "public" side network, which is hosted by router 112. Router 112, in turn, uses a "public" side address of 10.102.10.2 on the network shared with WAN gateway 110 and router 113. In one embodiment, server 104 initially determines its network location by performing TRACEROUTE or similar analysis to one or more nodes on network 110, such as server 120. The resulting TRACEROUTE data will identify addresses used by router 111, router 112, router 110 and any additional routing nodes in forwarding traffic to server 120 on network 105.

In various embodiments, server 104 can further increase its visibility to clients on other networks by issuing a BIND command (or the like) to one or more of its intervening routers 111, 112, 110. The BIND command will establish a port number with the bound router that can be used to forward messages to server 104. Server 104 may attempt to bind to router 111 or router 112 to obtain a port number on address 10.20.1.2 (router 111) or 10.20.1.1 (router 112) that can be used to receive messages on the 10.20.1.x network. Similarly, server 104 may additionally or alternatively attempt to BIND to the 10.102.10.x network via router 112 and/or router 110, as desired, to obtain an address on the 10.102.10.x network as well. Once the server 104 establishes one or more port numbers and/or addresses with another router, this information can be forwarded to the address server 120 for storage in a database 124.

Client 102 suitably transmits a query message to server 120 to obtain contact information for any servers 104 operating in environment 100. In various embodiments, address server 120 recognizes servers 104 operating in the same network environment 100 as client 102 by a shared address on network 105. That is, any devices operating behind router 110 will typically exhibit a common IP address (182.71.244.110 in the FIG. 1 example) on network 105. Address server 120 can use this shared IP address to identify clients 102 and/or servers 104 that are located behind the same gateway device 110.

Address server 120 responds to queries from one or more clients 102 by providing the sequences of address information 125 from database 124 for any servers 104 operating on the same network environment 100 as client 102. Address information can include the addresses used by routers 110-112 to forward traffic to server 104, the address/port number pairs for any bound connections associated with server 104, and/or any other information as desired. Note that the different devices will typically exhibit different port numbers associated with the common WAN address; these unique port numbers may be stored by address server 120 and returned to clients 102 with subsequent address requests to facilitate connections using the shared-IP-but-unique-port-on-the-WAN, if desired.

Client 102 can then attempt to contact server 104 within the local environment using one or more of the addresses/port numbers associated with the server 104 that are provided by address server 120, as desired. The addresses provided by address server 120 may be tried in series or parallel until a successful connection 140 between client 102 and server 104 is achieved. Connections may be attempted using, for example, network address translation (NAT) hole punching or the like.

In various embodiments, connection 142 from client 102 to address server 104 does not take place via router 110. A cellular phone client 102, for example, may establish connection 142 via a mobile telephone connection using a separate digital network. Client 102 will typically provide a local address or other information that can be used to associate client 102 with the WAN address on network 105 that is used by router no so that address server 120 can identify relevant servers 104 operating on the relevant network, but this information need not be provided via the home network itself. In further embodiments, address server 120 could maintain a device or user identifier associated with client device 102 and/or a user of client device 102 in a database. This identifier can be associated with a known address on network 105, or a known server 104 (e.g., a television receiver or digital video recorder that is registered to the same user's account). In such embodiments, address server 120 could use the network address of the known server 104 to identify other servers 104 that are operating on the same network environment 100.

In still further embodiments, clients 102 and servers 104 may be registered with a user account or the like so that it is not necessary to compare the WAN addresses of the different devices. To the contrary, address server 120 may be able to identify one or more server devices 104 that are associated with the same user account as client 102 and automatically forward the local addresses that are known for those devices, regardless of whether the addresses match the addresses associated with the client 102.

Conversely, address server 120 may compare more than one address submitted by client 102 to identify any matches. Even if matches are not identified behind the WAN address, servers having matching addresses may be identified behind one or more local addresses, if desired. This may allow local connections to be established even in home environments that have multiple WAN connections, as desired.

Generally speaking, server 120 is implemented as a network server system using conventional processors, memory, interfaces and other computing hardware under the control of an appropriate operating system and application software. Equivalently, server 120 may be implemented using any sort of "cloud-based" hardware, such as the Amazon Web Services product available from Amazon.com, or any other cloud service such as Microsoft Azure, Google Cloud Platform, Adobe Cloud, VMware, IBM Cloud, Rackspace, Red Hat and/or the like.

Both client 102 and server 104 can be implemented using conventional data processing hardware, software, firmware, etc. In various embodiments, server 104 may be a digital video recorder (DVR), IP television client or other network appliance that provides video streams to one or more client devices 102. To that end, server 104 may be implemented with conventional processors, memory or mass storage, network interfaces and other computing hardware as appropriate. Similarly, client device 102 may be implemented with any sort of mobile phone, tablet, personal computer, streaming media client, web browser device or the like. Client device 102 will typically include conventional processor, memory and interface hardware as well as appropriate operating systems and application software as appropriate.

Figure 2:
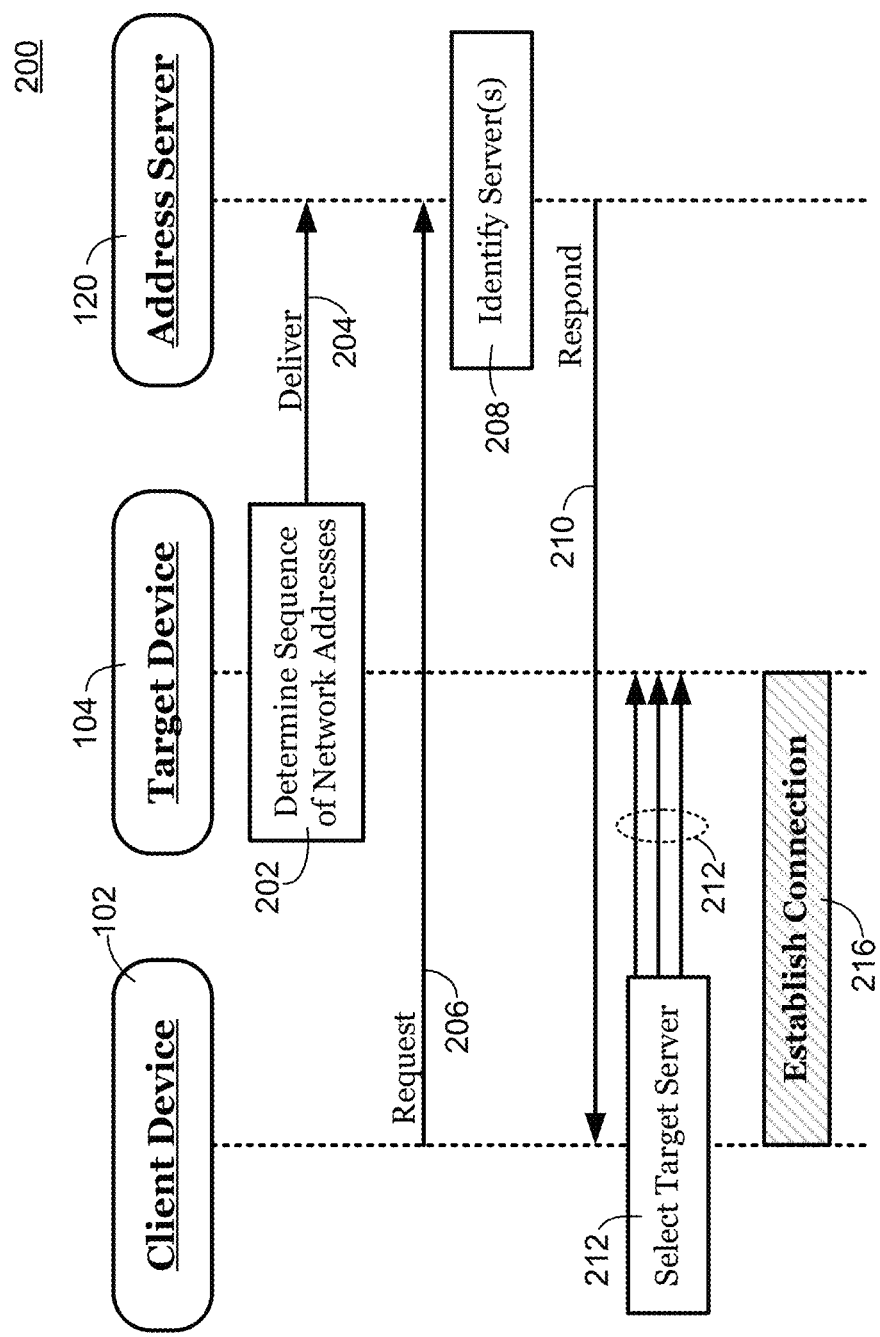
FIG. 2 illustrates data communications occurring within a network environment to facilitate improved location and communication with target devices.

FIG. 2 illustrates an example process 200 that can can be used to automatically locate server 104 and/or establish a connection between client 102 and server 104. The various functions shown in FIG. 2 may be performed under the direction of software and/or firmware instructions that are stored in digital memory or mass storage for execution by one or more processors. The process 200 illustrated in FIG. 2 is intended as an example that illustrates the broad concepts described herein; any number of equivalent embodiments could modify the particular logic described, and/or could implement different functions in any other temporal order, or using different hardware entities as desired.

As noted above, each server device 104 operating within a network environment 100 initially determines its own network information as appropriate (function 202). In various embodiments, the determination is performed using a UNIX/LINUX-type TRACEROUTE function that identifies routing devices along a path from a source to a destination. In various embodiments, a TRACEROUTE from server 104 to address server 120 (or any other service on network 105) will identify the different routers 110-112 residing within the local environment 100, as well as any relay nodes within network 105. The server 104 may attempt to bind to one or more of the identified routers 110-112; alternatively, the server 104 may simply report the addresses of the intervening routers without separately binding to the router, as desired. Generally, the network information 125 will include a sequence of network addresses and/or port numbers that have been identified for relaying network traffic to server 104. These addresses may be conventional IP addresses/port numbers; equivalent embodiments could support any number of additional or alternate protocols and address formats, as desired, including IPv6 addresses or the like.

Network information 125 is forwarded to address server 120 in any manner (function 204). In various embodiments, server 104 is able to make an outgoing network connection via the WAN 105 via router 110. Network information 125 may be delivered using HTTP PUT statements, FTP/TFTP file transfers, SMTP or other messaging, or in any other manner. In some embodiments, address server 120 provides an application program interface (API) that accepts in network information 125 in XML, SOAP or similar format. Address server 120 stores the received information 125 in database 124 for subsequent retrieval.

Upon receipt of a subsequent request message 206 transmitted by client 102, the address server 120 suitably identifies any server(s) 104 operating within the same network environment 100 as client 102 (function 208), obtains the stored address information for each identified server 104, and forwards the retrieved address information 125 back to the requesting client 102 (function 210). As noted above, the address server 120 may identify relevant servers 104 through a shared WAN address corresponding to router 110, or in any other manner. Address information 125 about the identified server(s) may be formatted for storage, retrieval and/or delivery in any appropriate manner, including any sort of XML, SOAP, REST or other formats.

The client device 102 appropriately selects one of the available servers 104 based upon user selection, or in any other manner (function 212). In various embodiments, the client 102 could automatically select a server 104 based upon the closest server 104 (e.g., fewest network hops to connect), based upon the last server 104 contacted by the client 102, or in any other manner.

The client device 102 then attempts to connect to the selected server 104 to establish a data connection (function 214). In various embodiments, the network information 125 received for the server 104 includes a sequence of network addresses within environment 100 that are associated with the server 100. The client 102 can initiate contact with the server 104 by sending connection request messages to one or more of the addresses in the sequence. Other embodiments may use further techniques (e.g., network address translation (NAT) "hole punching") to guess connection port numbers or to otherwise attempt to establish connections with the identified address. Addresses in the sequence may be contacted in series or in parallel, as desired for the particular embodiment. In at least one implementation, client 102 sends connection request packets to each of the addresses/ports identified in the received network information 125 in hopes that at least one connection request will be received by server 104. Server 104 may be programmed to ignore subsequent requests from a client 102 if multiple requests are received; further embodiments could allow server 104 to choose which of the various connection requests to respond to based upon the first request received, or any other indicia that one connection address may be favored over another.

When communications are established between the client 102 and server 104 using the local network environment 100, then a data connection 216 can be established. The data connection 216 may be used for media streaming in some embodiments; equivalent embodiments could use the connection for file transfers, video gaming, IPTV and/or any other purposes as desired.

The general concepts set forth herein may be modified in any number of ways. Although the network environment is often described herein as a "home" environment, equivalent concepts could be applied to offices, schools, factories, restaurants and bars, and/or any number of other environments that make use of multiple local area networks. Moreover, the concepts described herein with respect to contacting video servers to establish video streaming could be equivalently applied for other applications or purposes, such as internet television (IPTV), video gaming, home or office control, file or print sharing and/or any other applications as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by a target computing device to establish a connection with a client device within a network environment, wherein the target computing device and the client device are located on separate local area networks within a network environment operating behind a shared gateway to a wide area network, the process comprising:

determining, by the target device, a plurality of network addresses corresponding to router devices that couple the target device to the wide area network so that each of the plurality of network of addresses is associated with the target device, wherein at least some of the plurality of network addresses are internet protocol (IP) addresses corresponding to a port on a router device operating within the network environment, wherein the port is uniquely associated with the target device;

providing the plurality of network addresses to an address server operating on the wide area network for storage by the address server and subsequent transmission of the plurality of network addresses from the address server to the client device; and subsequently responding to a request received by the target device from the client device, wherein the client device obtains the plurality of network addresses from the address server and transmits the request to each of the plurality of network addresses that is associated with the target device obtained by the client device from the address server on the wide area network.

2. The automated process of claim 1 wherein the router device is configured to forward communications received on the port to the target device.

3. A device comprising a processor and a memory, wherein the processor is configured to execute machine-readable instructions that are stored in the memory and that, when executed, carry out a process to establish a connection with a client device located on a separate local area network within a network environment behind a shared gateway to a wide area network, the process comprising:

determining, by the target device, a plurality of network addresses each corresponding to router devices that couple the target device to a wide area network so that each of the plurality of network of addresses is associated with the target device, wherein at least some of the plurality of network addresses are internet protocol (IP) addresses corresponding to a port on a router device operating within the network environment, wherein the port is uniquely associated with the target device;

providing the plurality of network addresses to an address server operating on the wide area network for storage by the address server and subsequent transmission of the plurality of network addresses from the address server to the client device; and subsequently responding to a request from the client device by the target device, wherein the client device obtains the plurality of network addresses from the address server and transmits the request to each of the network addresses in the plurality of network addresses associated with the target device obtained by the client device from the address server on the wide area network.

4. The device of claim 3 wherein the router device is configured to forward communications received on the port to the target device.

5. An automated process executable by an address server system operating on a wide area network to establish a direct connection between a client device and a target device that are both operating on separate local networks within a local network environment behind a shared gateway to the wide area network, the process comprising:

receiving, by the address server system, a plurality of local addresses associated with a target device operating within the local network environment that is separated from the wide area network by the shared gateway, wherein each of the plurality of network addresses corresponds to a different network address associated with the same target device within the network environment and wherein at least some of the plurality of network addresses are internet protocol (IP) addresses corresponding to a port on a router device operating within the network environment, wherein the port is uniquely associated with the target device;

storing the received plurality of addresses in a database;

subsequently receiving, by the address server system, a request for server addresses from a client device that is also operating on the local environment that is separated from the wide area network by the router;

transmitting, by the address server system in response to the request received from the client device, the plurality of network addresses associated with the target device to the client device to thereby permit the client device to initiate a connection between the client device and the target device by transmitting contact messages to each of the different network addresses in the plurality of addresses that are associated with the same target device via the local environment.

6. The automated process of claim 5 wherein the router device is configured to forward communications received on the port to the target device.

7. The automated process of claim 5 wherein the client device transmits the request to the address server system via a mobile telephone connection that is separate from the local network environment.

8. The automated process of claim 5 wherein the address server system further associates the client device with a server device, and wherein the address server system identifies other server devices operating in the same local network environment as the associated server device according to a wide area network address of the server device.

* * * * *